US009223717B2

(12) United States Patent
Sohi et al.

(10) Patent No.: US 9,223,717 B2
(45) Date of Patent: Dec. 29, 2015

(54) COMPUTER CACHE SYSTEM PROVIDING MULTI-LINE INVALIDATION MESSAGES

(71) Applicant: Wisconsin Alumni Research Foundation, Madison, WI (US)

(72) Inventors: Gurindar S. Sohi, Madison, WI (US); Hongil Yoon, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 243 days.

(21) Appl. No.: 13/646,838

(22) Filed: Oct. 8, 2012

(65) Prior Publication Data

US 2014/0101390 A1 Apr. 10, 2014

(51) Int. Cl.
*G06F 12/08* (2006.01)

(52) U.S. Cl.
CPC ........ *G06F 12/0891* (2013.01); *G06F 12/0815* (2013.01)

(58) Field of Classification Search
None
See application file for complete search history.

(56) References Cited

U.S. PATENT DOCUMENTS

| 5,706,435 | A  | * | 1/1998 | Barbara et al. | 711/141 |
| 6,681,283 | B1 | * | 1/2004 | Thekkath et al. | 710/305 |
| 7,673,295 | B1 | * | 3/2010 | Lin | 717/156 |
| 2005/0198437 | A1 | * | 9/2005 | Mukherjee | 711/118 |
| 2007/0038797 | A1 | * | 2/2007 | McBride et al. | 711/3 |
| 2008/0320236 | A1 | * | 12/2008 | Ueda et al. | 711/146 |
| 2013/0254488 | A1 | * | 9/2013 | Kaxiras et al. | 711/130 |
| 2014/0025891 | A1 | * | 1/2014 | McCormack et al. | 711/119 |
| 2014/0052892 | A1 | * | 2/2014 | Klein et al. | 711/103 |

FOREIGN PATENT DOCUMENTS

WO  WO2013/186694 A2 * 12/2013 ............. G06F 12/10

OTHER PUBLICATIONS

Peter Keleher. "Lazy Release Consistency for Distributed Shared Memory." Jan. 1995. PhD Thesis. Rice University.*
Singh et al. "End-To-End Sequential Consistency." Jun. 2012. IEEE. ISCA '12. pp. 524-535.*
Geoffrey M. Brown. "Asynchronous multicaches." 1990. Springer-Verlag. Distributed Computing. vol. 4. pp. 31-36.*
Shibayama et al. "An Optical Computer Cluster with a Deferred Cache Coherence Protocol." Jun. 1996. IEEE. ICPADS '96. pp. 175-182.*
Cox et al. "A Performance Comparison of Homeless and Home-based Lazy Release Consistency Protocols in Software Shared Memory." Jan. 1999. IEEE. HPCA 1999. pp. 279-283.*
Sarita V. Adve, Kourosh Gharachorloo, Shared Memory Consistency Models: A Tutorial, Research Report, Sep. 1995,pp. 1-23, Department of Electrical and Computer Engineering, Rice University, Houston Texas.

(Continued)

*Primary Examiner* — Nathan Sadler
(74) *Attorney, Agent, or Firm* — Boyle Fredrickson, S.C.

(57) ABSTRACT

A computer cache system delays cache coherence invalidation messages related to cache lines of a common memory region to collect these messages into a combined message that can be transmitted more efficiently. This delay may be coordinated with a detection of whether the processor is executing a data-race free portion of the program so that the delay system may be used for a variety of types of programs which may have data-race and data-race free sections.

17 Claims, 6 Drawing Sheets

(56) References Cited

OTHER PUBLICATIONS

John K. Bennett, John B. Carter, Willy Zwaenepoel, Adaptive Software Cache Management for Distributed Shared Memory Architectures, Research Report, pp. 125-134, Department of Electrical and Computer Engineering, Department of Computer Science, Rice University, Houston Texas.

Jason F. Cantin, James E. Smith, Mikko H. Lipasti, Andreas Moshovos, Babak Falsafi, Coarse-Grain Coherence Tracking: RegionScout and Region Coherence Arrays, IEEE Micro, Jan.-Feb. 2006, pp. 70-79, IEEE Computer Society, Madison WI, www.computer.org/publications/dlib.

Byn Choi, Rakesh Komuravelli, Hyojin Sung, Robert Bocchino, Sarita Adve, Vikram Adve, DeNovo: Rethinking Hardware for Disciplined Parallelism, HotPar, 2010, pp. 1-7, University of Illinois at Urbana-Champaign, denovo@cs.illinois.edu.

Blas Cuesta, Alberto Ros, Maria E. Gomez, Antonio Robles, Jose Duato; Increasing the Effectiveness of Directory Caches by Deactivating Coherence for Private Memory Blocks; ISCA'11, Jun. 4-8, 2011; pp. 1-11; Department of Computer Engineering; San Jose, California, USA.

Michel Dubois, Jin Chin Wang, Luiz A. Barroso, Kangwoo Lee, Yung-Syau Chen; Delayed Consistency and Its Effects on the Miss Rate of Parallel Programs; Supercomputing 1991; pp. 1-10; Department of EE-Systems, University of Southern California, Los Angeles, CA 90089-2562.

Magnus Ekman, Fredrik Dahlgren, Per Stenstrom; TLB and Snoop Energy-Reduction using Virtual Caches in Low-Power Chip-Multiprocessors; ISLPED '02, Aug. 12-14, 2002, Monterey, California; pp. 1-4.

Stefanos Kaxiras, Georgios Keramidas; SARC Coherence: Scaling Directory Cache Coherence in Performance and Power; IEEE Computer Society, Sep./Oct. 2010; pp. 54-65.

Alvin R. Lebeck, David A. Wood; Dynamic Self-Invalidation: Reducing Coherence Overhead in Shared-Memory Multiprocessors; Proc. of 22nd ISCA, 1995; Madison, Wisconsin; pp. 48-59.

Andread Moshovos; RegionScout: Exploiting Coarse Grain Sharing in Snoop-Based Coherence; Proc of 32nd ISCA, 2005; University of Toronto, www.eecg.toronto.edu/aenao.

Andreas Moshovos, Gokhan Memik, Babak Falsafi, Alok Choudhary; Jetty: Filtering Snoops for Reduced Energy Consumption in SMP Servers; Proc. of 7th HPCA, 2001; IEEE Computer Society.

Jason Zebchuk, Elham Safi, Andreas Moshovos; A Framework for Coarse-Grain Optimizations in the On-Chip Memory Hierarchy; Proc. of 40th IEEE Micro, 2007; University of Toronto, IEEE Computer Society; pp. 314-326.

Jason Zebchuk, Vijayalakshmi Srinivasan, Moinuddin K. Qureshi, Andreas Moshovos; A Tagless Coherence Directory; Proc. of 42nd IEEE Micro, Dec. 12-16, 2009; New York, NY, USA.

Pete Keleher et al.; Lazy release Consistency for Software Distributed Shared Memory, Proc of 19th ISCA, ACM 1992; Department of Computer Science, Rice University; pp. 13-21; New York, NY.

\* cited by examiner

COMPUTER CACHE SYSTEM PROVIDING MULTI-LINE INVALIDATION MESSAGES

STATEMENT REGARDING FEDERALLY SPONSORED RESEARCH OR DEVELOPMENT

This invention was made with government support under 0963737 awarded by the National Science Foundation. The government has certain rights in the invention.

CROSS REFERENCE TO RELATED APPLICATION

--

BACKGROUND OF THE INVENTION

The present invention relates to computer architectures and in particular to a memory cache system reducing the burden of cache coherence message transmission.

Computer processors may have cache memories which serve to reduce the processing delay associated with waiting for data from a main memory. Data expected to be used by the processor in executing a program is loaded into the cache memories. The architecture and proximity to the processor of the cache memory provide faster data access to the processor when the data is needed.

Cache coherence protocols are used when multiple processors and caches may access a common main memory. These cache coherence protocols coordinate changes in the data in individual caches (for example caused by one processor writing to its cache memory) so that the data accessed by the different processors is practically consistent. One common cache coherence protocol is the MSI coherence protocol in which the data of the cache is given a status of modified, shared, or invalid.

Generally, under such cache coherence protocols, when a given processor writes data to its cache, an invalidation message is communicated to the other caches to inform them that the corresponding data in their caches is no longer valid. The process of coordinating caches may be effected through a directory which receives and transmits coordination messages between the individual caches.

In complex multiprocessor systems, invalidation messages place severe demands on the bandwidth of inter-cache communication channels. The transmission of these messages can also represent a significant amount of energy consumption and generated heat.

SUMMARY OF THE INVENTION

The present inventors have recognized that in many cases temporally proximate invalidation messages are related to a common region of memory. By combining these invalidation messages with a single reference to the common region of memory, the amount of invalidation message traffic can be significantly reduced. Combining invalidation messages requires that some invalidation messages be delayed to be collected together with later invalidation messages. Normally invalidation messages must be sent substantially immediately to preserve cache coherence; however, delay of invalidation messages is possible in periods of program execution where data-race conditions do not occur, that is, conflicting changes of common data by different processors. By delaying and collecting invalidation messages associated with common regions of memory during program executions that do not have data-races, the present invention reduces invalidation network traffic and energy consumption.

More specifically, in one embodiment, the present invention provides a computer architecture having: a cache memory holding lines of data that may be individually invalidated, a processor for executing program instructions operating on data from the cache memory, and a cache controller. The cache controller operates to (a) detect access of cache lines by operations of the processor where the access requires a transmission of invalidation messages for coherent cache operation; (b) delay communication of the invalidation messages and (c) collect multiple delayed invalidation messages in a single combined invalidation message and transmit the single combined invalidation message instead of multiple invalidation messages.

It is thus a feature of at least one embodiment of the invention to reduce the amount of data that must be transmitted for cache coherence with benefits in reduced system complexity, reduced energy consumption, and reduced heat generation.

The cache controller may further operate to detect whether current execution of instructions by the processor are from a data-race free region of the program, the data-race free region being a sequence of instructions operating on data that is unlikely to be invalidated by other processors during execution of the data-race free region by the processor and to perform steps (b) and (c) based on detecting that the current execution of instructions is from a data-race free region of the program.

It is thus a feature of at least one embodiment of the invention to control the delay of invalidation messages according to a characterization of the program being executed. This characterization permits the invention to operate in an environment where data-race free execution of a program by multiple processors cannot be guaranteed.

The multiple delayed messages may be selected to be collected in a single combined invalidation message according to whether the multiple delayed messages relate to cache lines from a common region of a main memory.

It is thus a feature of at least one embodiment of the invention to reduce data transmission by sharing information in the combined invalidation message related to a common address region of the multiple invalidated lines.

The combined invalidation message may provide an address in the main memory of the common region and provide multiple subaddresses of the invalidated lines whereby data transmitted in the combined invalidation message is less than the total data of the individual invalidation messages that are combined; wherein the subaddresses are selected from the group consisting of bit vectors having a bit for each line of the common region and address offsets from an address of the common region.

It is thus a feature of at least one embodiment of the invention to eliminate redundant information in the addresses of the common region and the invalidated lines by casting the address of the invalidated lines as bit vectors or offsets.

The cache controller may further operate to not delay communication of the invalidation messages when the current execution of instructions are not from a data-race free region of the program and transmits the invalidation messages without combination with other invalidation messages.

It is thus a feature of at least one embodiment of the invention to permit the present invention to work with a variety of different operating environments where strict parallel execution may not be enforced.

The cache controller may further operate to receive combined invalidation messages relating to multiple cache lines and to transmit a combination acknowledgement message combining multiple acknowledgement messages for each cache line of the combined invalidation message.

It is thus a feature of at least one embodiment of the invention to provide a data transmission saving in the acknowledgment process as well as in the invalidation message.

Transmission of the combined invalidation message may be triggered by current execution of instructions by the processor leaving the data-race free region of the program.

It is thus a feature of at least one embodiment of the invention to maximize the opportunity for invalidation message combination.

The cache controller may operate to delay communication of the invalidation message associated with a cache line only if a delay permission is granted for that cache line, wherein the delay permission indicates that no other cache has modified data of that cache line.

It is thus a feature of at least one embodiment of the invention to prevent problems with "false sharing" where distinct data exclusively executed by different processors is nevertheless on the same cache line. The permission system allows such false sharing problems to be addressed.

The cache controller may operate to transmit a request for permission for cache lines from a directory.

It is thus a feature of at least one embodiment of the invention to provide a permission system compatible with directory cache coordination.

The request for permission may be triggered by a first required invalidation message for a region of main memory not common to current delayed invalidation messages.

It is thus a feature of at least one embodiment of the invention to eliminate unnecessary permission requests.

The request for permission may include that first required invalidation message.

It is thus a feature of at least one embodiment of the invention to take advantage of the permission request to perform the invalidation thereby saving data transmission if no other invalidation messages arrive for combination.

The processor may be a single core processor, a multiple core processor, a multithreaded processor, a heterogeneous processor, an accelerator, a graphic processor unit, or the like.

It is thus a feature of at least one embodiment of the invention to provide a system that may be broadly used with a variety of different processor types.

The detection of data-race free regions may detect instructions in the program demarcating the boundaries of data-race free regions in the program.

It is thus a feature of at least one embodiment of the invention to provide a simple method of determining data-race free regions that can be implemented by a compiler or the programmer.

These particular objects and advantages may apply to only some embodiments falling within the claims and thus do not define the scope of the invention.

DETAILED DESCRIPTION OF THE PREFERRED EMBODIMENT

Figure 1:
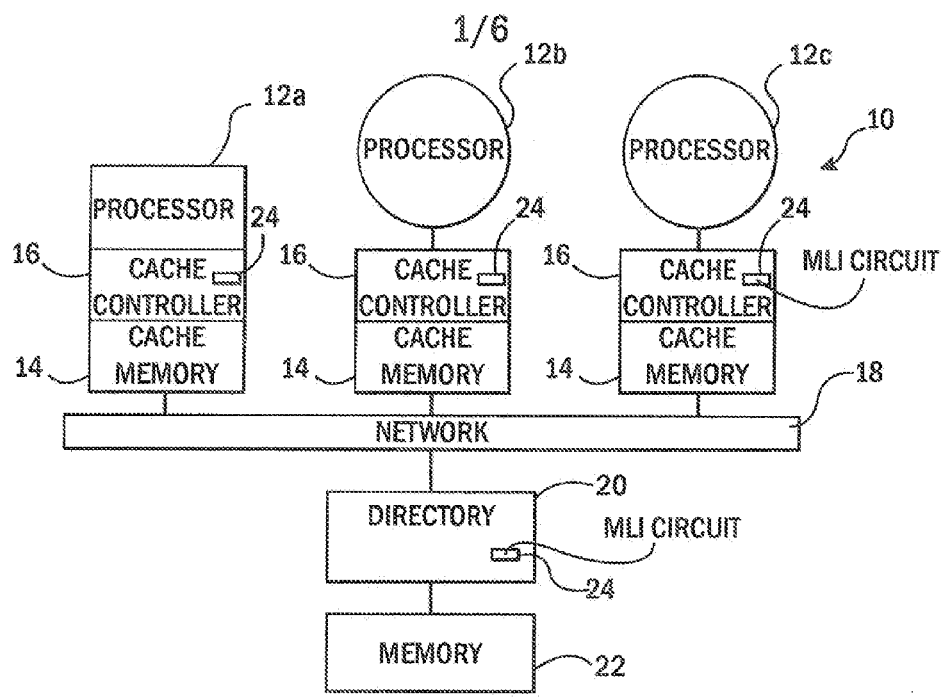
FIG. 1 is a simplified block diagram of a multiprocessor system showing different processor types each associated with caches and cache controllers, the system employing a directory/memory controller providing access to a main memory, each of the cache controllers and the directory having a multiple line invalidation message unit of the present invention.

Referring now to FIG. 1, a cache-coherent multiprocessor system 10 may include multiple processors 12a-c each being, for example, single or multicore processors, or multithreaded processors, or homogeneous or heterogeneous processors, or special processors such as a graphic processor unit or accelerators, or other type of processor. Each processor 12 may be associated with one or more cache memories 14 coordinated by corresponding cache controllers 16.

The cache controllers 16 may inter-communicate on a network 18 with a cache directory 20 that in turn connects to a main memory 22 shared among each of the processors 12. Main memory 22 may, for example, be a combination of random access memory or other solid state memory and mass storage devices such as magnetic disks or other memory devices. Additionally, main memory 22 could employ a variety of different designs such as banking, interleaving, distributed memory, or others.

The cache controllers 16 and directory 20 operate together to provide a standard cache coherence protocol such as MSI as augmented by a multiline invalidation circuit 24 (MLI) whose operation will be described below. Generally the cache controllers 16 serve to load data from the main memory 22 into the cache memory 14 to be used by the associated processor 12 and to write modified data of the cache memory 14 back to the main memory 22 while preserving coherence of the data of the cache memory 14 with data of the other cache memories 14 or main memory 22 as is generally understood in the art.

Under the coherence protocol, when a processor 12 writes a value to its cache memory 14, an invalidation message must be transmitted (for example, to the directory 20) to notify the other cache memories 14 that may be sharing this data that they must evict that data and ultimately obtain a fresh copy if it is still needed. This invalidation message identifies a cache line holding the relevant data, the cache line being the smallest increment of the cache memory 14 that may be individually evicted or loaded.

Figure 2:
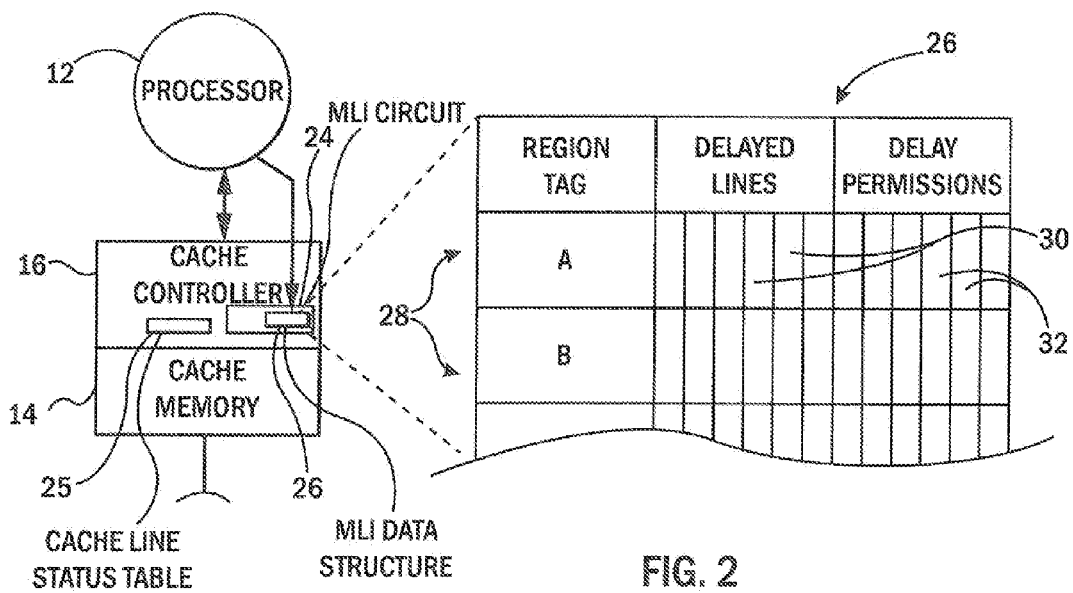
FIG. 2 is a fragmentary detailed block diagram of the cache controller showing a data structure used for managing multiple line invalidation messages.

Referring to FIGS. 1 and 2, the cache controllers 16 may provide for a standard cache line status table 25 providing the status of each cache line in the cache memory 14 (e.g. modified, shared, invalid) as well as identifying the cache line as a particular address in main memory 22. Each cache controller will also include the MLI circuit 24 associated with the present invention with an MLI data structure 26 that is used to track invalidation messages generated in the cache coherence protocol. This MLI data structure 26 links each generated invalidation message to a particular region of the main memory 22 representing a logical region of contiguous addresses in the main memory 22. This region will typically equal one or more units of transfer of memory data from the main memory 22 to the cache memory 14, for example a page. In the example of FIG. 2, invalidation messages are linked to regions A and B each depicted as a row in the MLI data structure 26. Generally each region will be identified by a region memory address, for example, indicating the beginning of the region in main memory 22.

Each invalidation message generated by the cache controller 16 under the cache coherence protocol can be recorded in a row 28 of the MLI data structure 26 by a line identification value 30 linked to a given region and providing a subaddress within the region associated with the invalidated line. The subaddress may be a bit of a bit vector designating by its location within the bit vector the given line. Alternatively, the subaddress may be an address offset between the starting address of the region (or some other region identifying address) and the cache line, for example, identifying the number of the cache line in the series of cache lines in the region. Thus, thus for example, if region A has 8 cache lines, the subaddress of the third cache line (if numbering is started from 0 as is common) will be binary 0000 0100. If the subaddress is represented as an address offset then this offset would be 2.

Each invalidation message recorded in each row 28 may also be associated with a delay permission indicating whether it is acceptable to delay transmission of the invalidation message as will be described below. These delay permissions may be represented by permission status value 32 as will be described.

Figure 3:
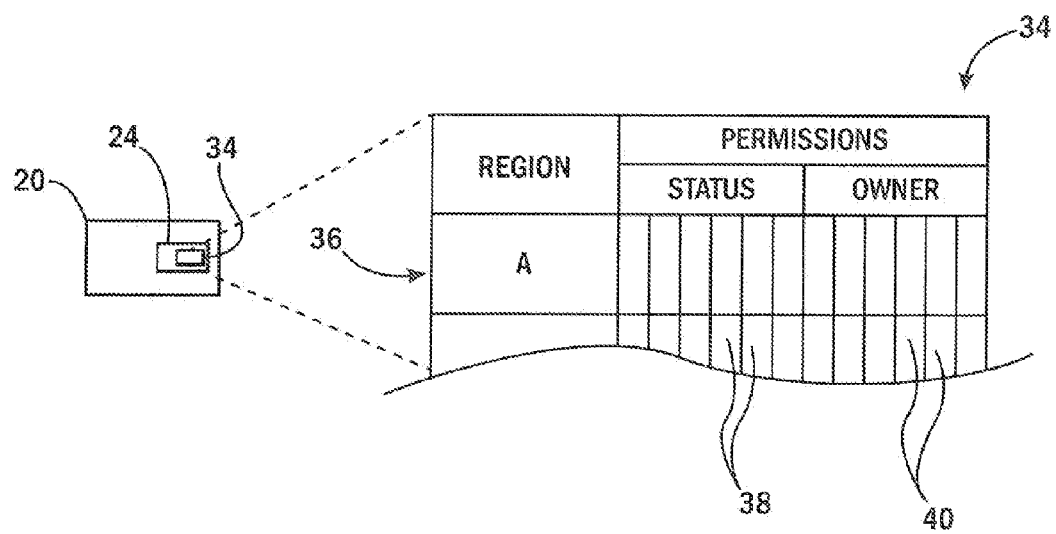
FIG. 3 is a fragmentary detailed block diagram of the directory/memory controller showing a data structure used for managing multiple line invalidation message permissions.

Referring now to FIGS. 1 and 3, in the directory 20, the MLI circuit 24 may be associated with an MLI permission table 34 used to coordinate the permissions reflected in the permission status value 32 held by the cache controller 16. The MLI permission table 34, like that of MLI data structure 26, includes rows 36 associated with given regions of main memory 22. Each cached line of a particular region is associated in a corresponding column in row 36 with a status flag 38. In one embodiment each cache is associated with an ownership flag 40, related to the delay permissions for one or more cache lines from the given region, that may be held by the given cache, as will be described below.

Figure 4:
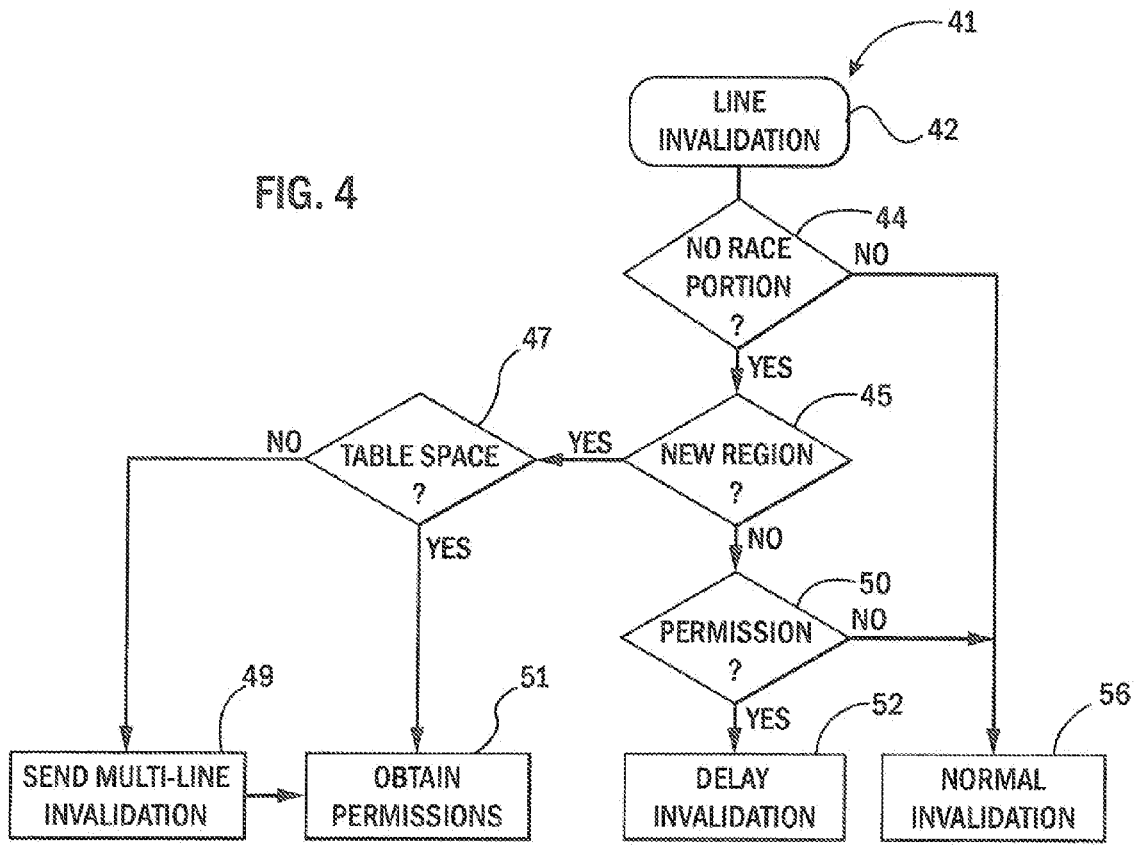
FIG. 4 is a simplified flowchart of the principal steps executed by the present invention.

Referring now to FIGS. 1 and 4, the MLI circuit 24 may execute an MLI program 41 (for example, firmware or discrete logic) to further process each invalidation message generated by the standard cache coherence protocol. This program generally checks to see if a given invalidation message can be delayed and combined with other invalidation messages associated with the common region. Upon the generation of an invalidation message indicated by process block 42, the cache controller 16 may determine at decision block 44 whether the processor 12 associated with that cache controller 16 is executing a program or portion of a program which is unlikely to have data-races with portions of the program executed by other processors 12 sharing the main memory 22.

Figure 5:
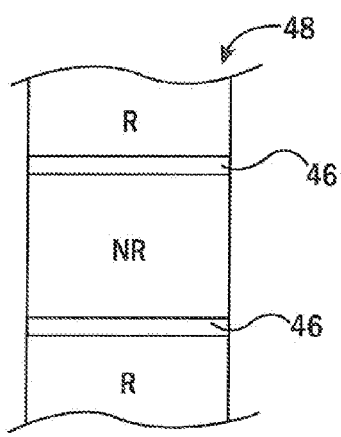
FIG. 5 is a diagrammatic representation of a program showing demarcating instructions for indicating regions of no data-races.

Referring now to FIG. 5, in one embodiment, this determination may be made by tracking demarcation instructions 46 in the program 48 that marked the beginning and an end of a non-race (NR) portion of the program. These demarcation instructions 46 may be placed by the user or by automatic compiler operation or in some other manner. Regions where there are unlikely to be data-races include, for example, portions of a program that are strictly "parallel" meaning generally that they operate on disjoint data sets (that is different data).

If at decision block 44, the program or program portion executed by the given processor 12 program is not in a race region, then at decision block 45, the MLI program 41 checks the MLI data structure 26 (as will be described in more detail below) to see if there are any previous currently delayed line invalidation associated with the particular region of memory containing the current line associated with the invalidation of process block 42.

If not, meaning that the current line invalidation is for a new region, the program proceeds to decision block 47 to determine whether there is room to handle the storage required for delaying an invalidation message for a new region. If there is insufficient storage space, then at process block 49, the program 41 frees space in the MLI data structure 26 by sending out a multi-line invalidation message associated with some currently delayed invalidation messages associated with another region and currently using the storage space in the MLI data structure 26. This process of sending out a multi-line invalidation message will be described below. The particular collected invalidation messages that are evicted, for example, may be those that have been in the MLI data structure 26 longest, or that have not been used for the longest time (least recently used) or some other criteria. This eviction frees up space in the MLI data structure 26 and operation then proceeds to process block 51 as discussed below.

If there is sufficient storage space in the MLI data structure 26 as determined at decision block 47, then the program proceeds to process block 51 to obtain delay permissions as will be described below. This process of obtaining delay permissions also operates to send out an un-delayed invalidation message for the line invalidation of process block 42.

Returning to decision block 45, if the incoming line invalidation of process block 42 is for a region for which MLI data structure 26 exists the program proceeds to decision block 50 to determine whether there is permission (indicated in the MLI data structure 26 of FIG. 2) for delaying the invalidation message. If permission is available, then at process block 52 the invalidation message may be combined with other invalidation messages for the same region.

If at either decision block 44 or 50, the condition of being in a no race region or having permission is not present, the program 41 reverts to a normal invalidation message transmission per the MSI or other standard protocol, as indicated by process block 56.

Figure 6:
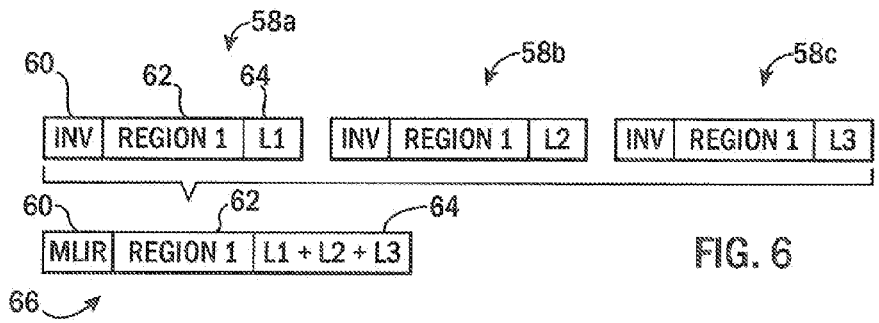
FIG. 6 is a data diagram of single line invalidation messages compared with a multiple line invalidation message produced by the present invention.

Referring now momentarily to FIG. 6 in the operation of process block 56 multiple single-line invalidation messages 58*a-c* will be sent. Each single-line invalidation message 58 will have a message header 60 indicating the type of message and other necessary message protocol data, a region identifier 62 indicating the region in main memory 22 of the cache line subject to invalidation, and a cache line subaddress 64. When the MLI program 41 can operate in the mode of process block 52, each of these invalidation messages 58*a-c* can be combined into a single combined invalidation message 66 which will be substantially compressed by eliminating the need to repeat the message header 60 and the address of the region identifier 62 and providing only a single message header, single region identifier 62, and combined multiple cache line subaddresses 64. In one embodiment the combined multiple cache line subaddresses 64 may simply be represented as a bit vector, with a 1 in the bit vector corresponding to a line to be invalidated and 0 otherwise. For example, if the bit vector is 8 bits, and bits 0, 1, and 3 are 1, and the remaining bits are 0, it means that lines 0, 1, and 3 in the given region are to be invalidated.

Figure 7:
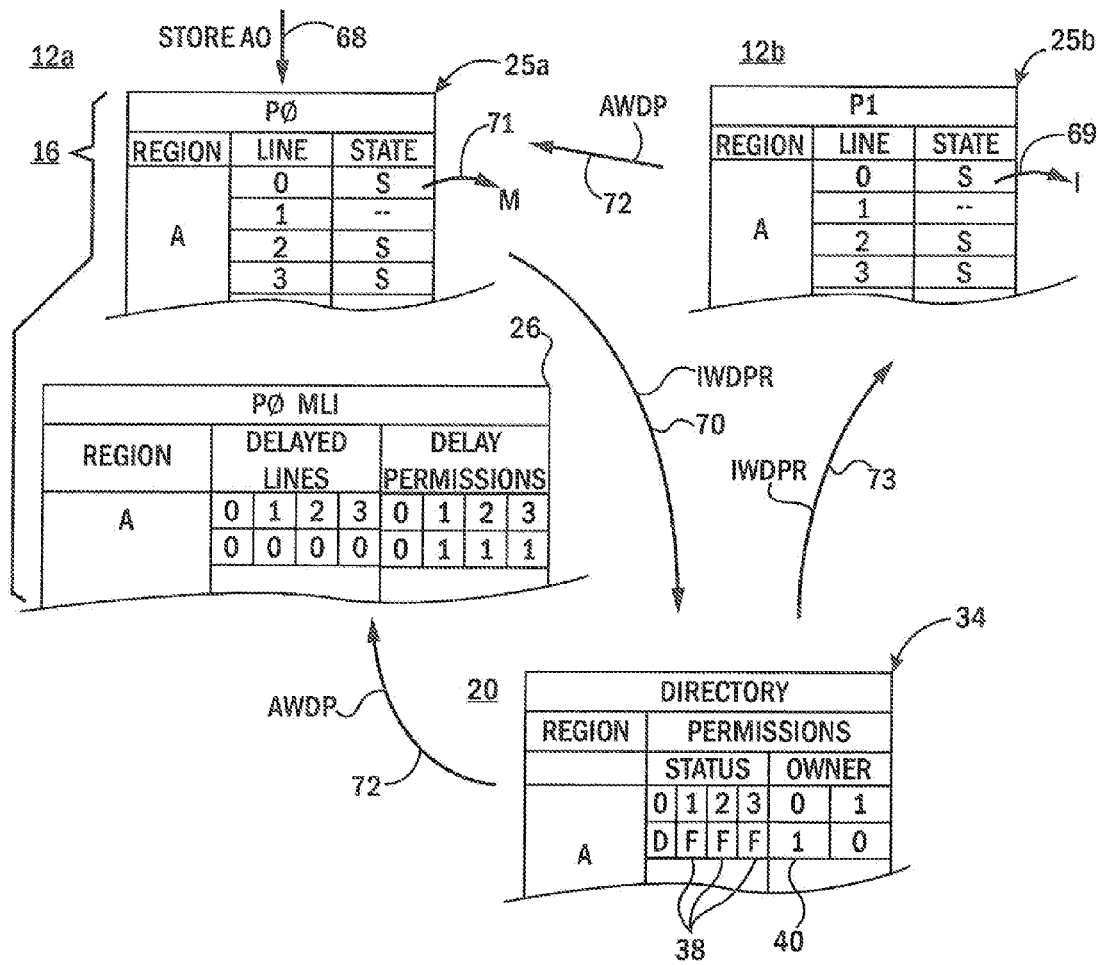
FIG. 7 is a data flow diagram showing coherence message data flows and their effects on data structures at the cache controllers and directory during the process of obtaining delay permission.

Referring now to FIG. 7, the steps of acquiring the permissions for MLI data structure 26 of a processor P0 will be described in more detail. In this example, it will be assumed that a processor P0 currently has stored data from cache lines 0, 2, and 3 of region A in cache memory 14. This data is indicated to be in a shared state S in the cache line status table 25a. Upon occurrence of a store operation by processor P0 related to cache line 0 of region A (as indicated by arrow 68) the cache controller 16 transmits to the directory 20 a permission request message (IWDPR) indicated by arrow 70. This permission request is triggered by the fact that the invalidation message for cache line 0 is the first invalidation message related to given region A for processor P0. This permission request message requests permissions for other cache lines of the region A. The directory 20 further transmits this IWDPR message per arrow 73 which may be received at other cache controllers 16 for the other processors 12, for example, the cache controller 16 at processor P1, where it operates to invalidate cache line 0 as indicated by arrow 69.

Upon receipt of the permission request message at the directory 20, an entry in MLI permission table 34 is generated (if there is no pre-existing entry for that region). In this case, it is assumed that there has been no previous entry for region A and therefore the directory 20 owns all of the permissions for all the cache lines of region A. Accordingly the directory 20 returns an acknowledgment message (AWDP) depicted by arrow 72 indicating that permission to delay each of the cache lines 1, 2, and 3 is granted to processor P0. Alternatively, the AWDP message may be sent directly from P1, as is also depicted. The directory 20 indicates that these permissions have been granted by an F tag in permissions status 38, indicating that the permissions to the corresponding lines have been forwarded to at least one of a set of cache controllers. The directory 20 sets the ownership flag 40, corresponding to P0, in MLI permission table 34, to indicate that the cache associated with P0 may now own delay permissions to some cache lines in region A. This ownership flag, 40, is reset when the corresponding cache returns the permissions to the directory, as will be described below.

The cache controller 16 for processor P0 records the permissions in a newly allocated buffer in MLI data structure 26 providing a flag (e.g. 1) for each of these cache lines in the delay permissions. In the case where there is a pre-existing entry in the MLI data structure 26, these permissions may be logically ORed to any existing permissions for that region. Also upon receipt of this acknowledgment signal, the cache controller 16 changes the state of cache line 0 to M as indicated by arrow 71 in the cache line status table 25 per standard coherence protocols.

Permission for cache line 0 is not provided to processor P0 because the invalidation message for this cache line has already been sent by the cache controller 16 for processor P0 and thus permission for delaying the invalidation message is not needed by processor P0. This cache line is marked with a D for dropped in the directory 20 indicating that it is not available for other processors.

Figure 8:
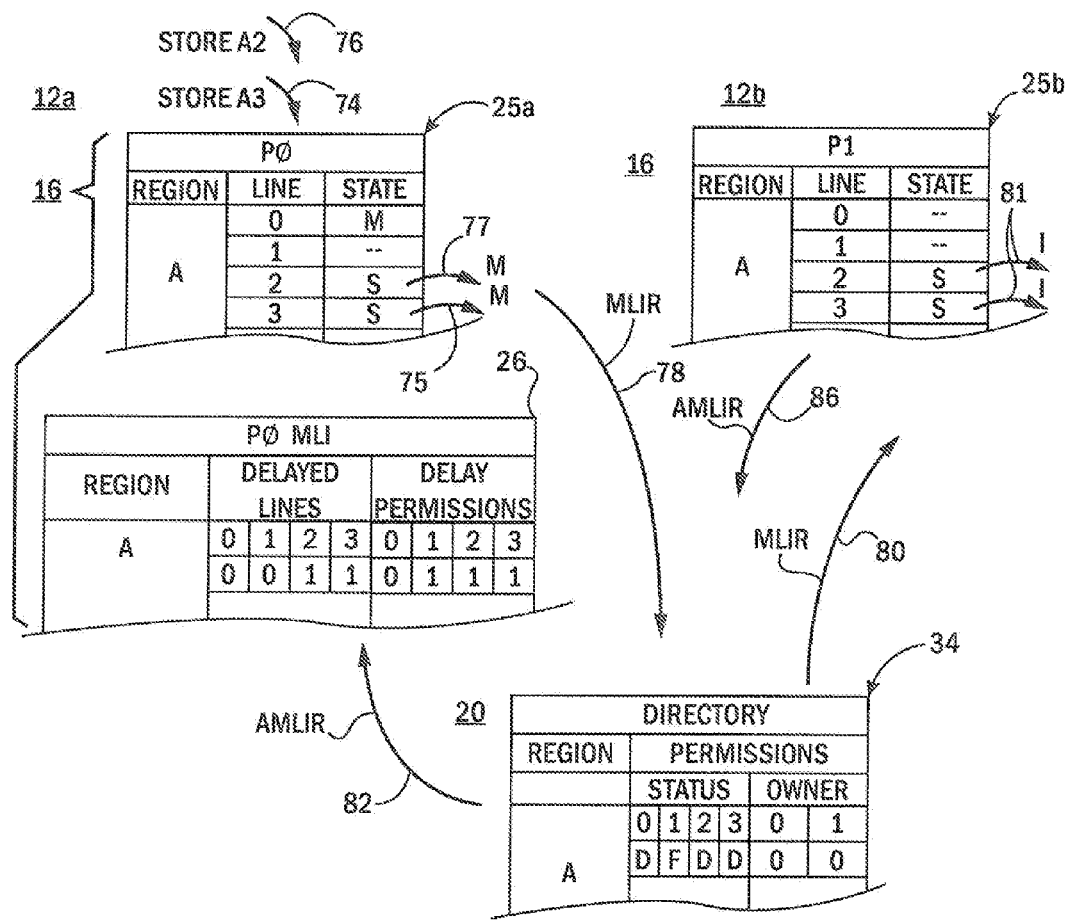
FIG. 8 is a figure similar to that of FIG. 7 showing transmission of a multiple line invalidation message.

Referring now to FIG. 8, after the cache controller 16 has obtained permissions for a particular region (e.g. region A), subsequent invalidation messages for that region may be accumulated to be combined in a combined, single invalidation message. For example, the cache controllers 16 of processor P0 may receive a new store operation to cache line A3 as indicated by arrow 74. Because permission for the delay of the invalidation message associated with this store is available in the MLI data structure 26, this invalidation will be delayed. The existence of a delayed invalidation message will be recorded in MLI data structure 26 in the delayed line column for the particular cache line implicated (cache line 3).

A subsequent store operation 76 for cache line 2 may proceed similarly with the delayed invalidation message recorded in the MLI data structure.

Transmission of multi-line invalidation messages will occur when the data-race region is exited or if there is an exhaustion of memory resources for MLI data structure 26 (for example, if more invalidation messages have occurred for more regions than can be stored). In this case, the cache controller 16 issues a multi-line invalidation message (MLIR) 66, for example, in the form shown in FIG. 6, to the directory 20 indicated by arrow 78.

When this MLIR message is received by the directory 20, the directory 20 determines those other cache memories 14 sharing the cache lines to be invalidated and forwards the multi-line invalidation messages to the corresponding cache controllers 16 per arrow 80 causing them to invalidate the corresponding cache lines in their associated cache memories 14. In this process, the status of those cache lines is marked invalid in the cache line status table 25 as indicated by arrows 81. At the other cache controller 16, an MLIR message may be simply decomposed into individual single line invalidation messages and processed according to standard cache coherence protocols for single line invalidation messages.

At the directory 20, the permission status for the cache line of region A that are to be invalidated by the recent MLIR message are changed from forwarded (F) to owned (O), indicating that these permissions have been returned to the directory and the ownership flag 40 corresponding to P0 is changed to 0 indicating that the cache associated with P0 no longer has delay permissions for any line in region A. When the ownership flags 40 are all 0, indicating that no cache has delay permissions for any cache line in region A, the directory owns the permissions for all the lines in the given region, and the corresponding row 36 in the MLI permission table 34 can be recycled, if needed.

At the given cache controllers 16 receiving of an MLIR message (for example, for processor P1), a combined acknowledgment message (AMLIR) analogous to the MLIR message is then returned as indicated by arrow 86 to the directory 20. This acknowledgment message is then forwarded to the cache controller 16 for processor P0 as indicated by arrow 82. In an alternative embodiment, the directory 20 may return an AMLIR message to cache initiating the MLIR message with a count of the number of additional AMLIR messages that it will receive from other caches. The corresponding AMLIR then may be transmitted directly from the remote caches to the requesting cache. For example, in FIG. 8, the AMLIR message may be transmitted directly from the processor P1 to the processor P0.

At the cache controller 16 for processor P0, after the last of the corresponding AMLIR messages has been received, the entry for region A in the MLI data structure 26 is evicted and the status of the cache lines in cache line status table 25 may be marked as modified per standard cache coherence protocol. Specifically, the state of cache line 3 may be changed to "modified" in the cache line status table 25 as indicated by arrow 75 and the status of cache line 2 may be changed to "modified" in the cache line status table 25 as indicated by arrow 77.

Figure 9:
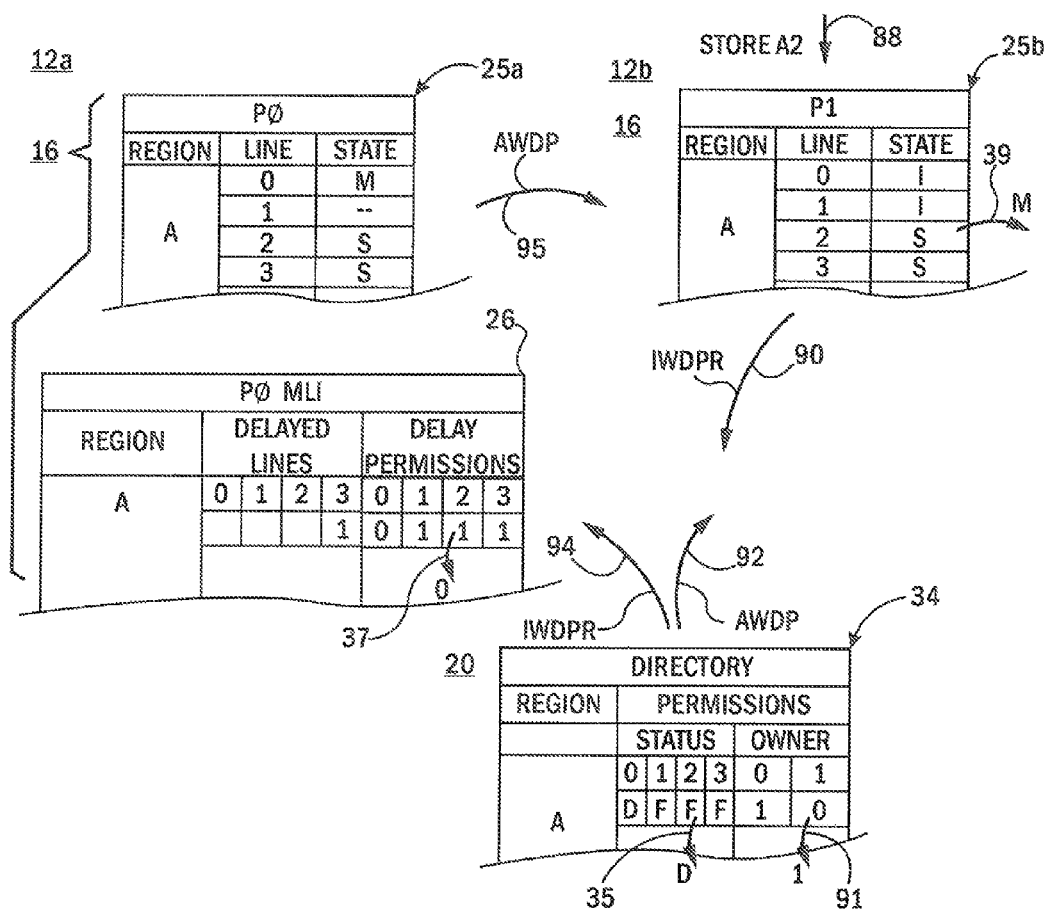
FIG. 9 is a figure similar to that of FIGS. 7 and 8 showing the modification of delay permissions to prevent false sharing problems.

Referring now to FIG. 9, in non-race regions of the program, two different cache memories 14 may nevertheless access the same cache lines as a result of different data coincidentally being in a single cache line. This is termed a "false sharing" event because it appears as if there is shared data between two processors when there is no actual sharing.

Assuming a state of the processors 12 at the conclusion of the store operations described with respect to FIG. 7, but where the cache controller 16 corresponding to processor P0 has subsequently delayed an invalidation for cache line 3, processor P1 may issue a store targeting cache line A2 as indicated by arrow 88. A permission request message (IWDPR) as indicated by arrow 90 may then be transmitted to the directory 20 to get the delay permissions for region A. The directory 20 determines that some of the permissions (i.e. for cache lines 1, 2, and 3) have already been forwarded to another remote cache controller (e.g. the cache controller of processor P0) and changes the delay permission of requested line 2 to dropped (D) as indicated by arrow 35. It also sets the ownership flag 40 corresponding to P1 to 1, as indicated by arrow 91, to indicate that P1 may have received some delay permissions as a consequence of the IWDPR message.

The IWDPR message is forwarded to other sharers as indicated by arrow 94 for the purpose of invalidating the indicated cache line in those cache memories 14 having that cache line in a shared state. Additionally, an acknowledgment signal (AWDP) is then returned to cache controller 16 of processor P1 as indicated by arrow 92. When this forwarded IWDPR message is received by the cache controller 16 corresponding to processor P0, the corresponding delay permission in the MLI data structure 26 is deleted as indicated by arrow 37. Thus no remote cache memories 14 have permission for cache line 2 which prevents the delaying of invalidation messages on "falsely shared" cache lines which may create data-races even in a non-data-race free region of the program. An acknowledgment signal (AWDP) is returned to the cache controller 16 of processor P1 as indicated by arrow 95. In one embodiment, delay permissions to some cache lines in the corresponding region A, that have been owned by the cache controller 16 corresponding to processor P0 can be given to the cache controller 16 corresponding to processor P1 along with the AWDP message.

Upon completion of this acknowledgment, the state of the cache line at processor P1 is changed to "modified" per conventional cache coherence operation as indicated by arrow 39. Now when region A in MLI permission table 34 is evicted a multi-line invalidation message for region A is sent from processor P0 even though the invalidation is for only a single cache line 3.

Once the delay permission status 38 for a cache line in a region A in directory 20 is changed to dropped (D), delay permission for the cache line is not forwarded to a cache controller 16 and thus further invalidations to that cache line will not be delayed. Delay permission for the given cache line will be available to be forwarded to a cache controller once the entry 36 for region A has been recycled from MLI permission table 34, as described above, and a new entry 36 for region A reallocated afresh in MLI permission table 34, as also described above.

It will be understood that the present invention may be applied to multiple level caches and that the above description represents generally treatment of a last cache level. A given cache coherence message will be understood to be data that is transmitted with an understood link between the data transmitted, for example, as being implicitly part of a single transaction or related to a single set of data.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A method of reducing data communication burden for cache coherence protocols in a multiprocessor system having multiple processors associated with cache memory holding lines of data that may be individually invalidated, the method comprising the steps at each processor of:

(a) delaying the transmission of cache line invalidation messages to other caches while collecting cache line invalidation messages related to different addresses in memory according to common regions of memory;

(b) combining the collected cache line invalidation messages in a compressed form while preserving the information of each collected invalidation message, the compressed form preserving the information of each invalidation message in that compressed form so that each of the invalidation messages including the multiple different addresses in memory could be reconstructed from the compressed collected invalidation message; and (c) transmitting the combined compressed invalidation messages instead of the cache line invalidation messages related to different addresses.

2. The method of claim 1 wherein step (a) is conditional on a determination at each processor that a given processor is executing a portion of a program free of potential data-races for data of the cache lines being combined.

3. A method of operating a computer of a type having a cache memory holding lines of data that may be individually invalidated and a processor executing program instructions operating on data from the cache memory, the cache memory communicating on a network with cache memories of other processors to exchange invalidation messages by transmission of invalidation messages between cache memories on the network, the method comprising the steps of operating a cache controller communicating with the cache memory to:
(a) detect access of cache lines by operations of the processor where the access requires a transmission of invalidation messages for the cache memory to other caches for coherent cache operation;
(b) detect whether current execution of instructions by the processor are from a data-race free region of the program, the data-race free region being a sequence of instructions operating on data that is unlikely to be invalidated by other processors during execution of the data-race free region by the processor;
(c) delay communication of the invalidation messages when the current execution of instructions is from a data-race free region of the program;
further including the step of collecting multiple delayed invalidation messages related to different addresses in a memory in a single combined invalidation message compressed with respect to the multiple delayed invalidation messages, while preserving the information of each invalidation message in that combined invalidation message so that each of the invalidation messages including the multiple different addresses in memory could be reconstructed from the compressed collected invalidation messages, and transmitting the single combined invalidation message instead of multiple invalidation messages; and
wherein the multiple delayed messages are selected to be collected in a single combined invalidation message according to whether the multiple delayed messages relate to cache lines from a common region of memory.

4. The method of claim 3 wherein the combined invalidation message provides an address in the memory of the common region and provides subaddresses of the invalidated lines whereby data transmitted in the combined invalidation message is less than the total data of the individual invalidation messages that are combined; wherein the subaddresses are selected from the group consisting of bit vectors having a bit for each line of the common region and address offsets from an address of the common region.

5. The method of claim 3 wherein the detection of whether current execution of instructions by the processor are from a data-race free region determines whether the current execution of instructions by the processor are operating on disjoint data sets with respect to processors of the other caches.

6. A computer architecture comprising:
a cache memory holding lines of data that may be individually invalidated;
a processor for executing program instructions operating on data from the cache memory;
a cache controller communicating with the cache memory and operating to:
(a) detect access of cache lines by operations of the processor where the access requires a transmission of invalidation messages for the cache memory to other caches for coherent cache operation;
(b) delay communication of the invalidation messages to the other caches; and
(c) collect multiple delayed invalidation messages related to different addresses in memory in a single combined invalidation message compressed with respect to the multiple delayed invalidation messages and transmit the single combined invalidation message to the other caches instead of the multiple invalidation messages, while preserving the information of each invalidation message in that combined invalidation message so that each of the invalidation messages including the multiple different addresses in memory could be reconstructed from the compressed collected invalidation messages; and
wherein the multiple delayed messages are selected to be collected in a single combined invalidation message according to whether the multiple delayed messages relate to cache lines from a common region of the memory.

7. The computer architecture of claim 6 wherein the cache controller further operates to detect whether current execution of instructions by the processor are from a data-race free region of the program, the data-race free region being a sequence of instructions operating on data that is unlikely to be invalidated by other processors during execution of the data-race free region by the processor and to perform steps (b) and (c) based on detecting that the current execution of instructions if from a data-race free region of the program.

8. The computer architecture of claim 7 wherein the cache controller further operates to not delay communication of the invalidation messages when the current execution of instructions are not from a data-race free region of the program and transmits the invalidation messages without combination with other invalidation messages.

9. The computer architecture of claim 7 wherein transmitting the combined invalidation message is triggered by current execution of instructions by the processor leaving the data-race free region of the program.

10. The computer architecture of claim 7 wherein detection of data-race free regions detects instructions in the program demarcating boundaries of data-race free regions in the program.

11. The computer architecture of claim 6 wherein the combined invalidation message provides an address in the memory of the common region and provides subaddresses of the invalidated lines whereby data transmitted in the combined invalidation message is less than the total data of the individual invalidation messages that are combined; wherein the subaddresses are selected from the group consisting of bit vectors having a bit for each line of the common region and address offsets from an address of the common region.

12. The computer architecture of claim 6 wherein the cache controller further operates to receive a combined invalidation message relating to multiple cache lines and to transmit a combination acknowledgement message combining multiple acknowledgement messages for each cache line of the combined invalidation message.

13. The computer architecture of claim 6 wherein the cache controller operates to delay communication of the invalidation message associated with a cache line only if a delay permission is granted for that cache line wherein the delay permission indicates that only the cache having the delay permission can delay the communication of an invalidation message.

14. The computer architecture of claim 13 wherein the cache controller operates to transmit a request for permission for cache lines from a directory.

15. The computer architecture of claim 14 wherein the request for permission is triggered by a first required invalidation messages for a region of memory not common to current delayed invalidation messages.

16. The computer architecture of claim 15 wherein the request for permission includes that first required invalidation message.

17. The computer architecture of claim 6 wherein processors are selected from the group consisting of single cores, multiple cores and graphic processor units.

* * * * *